L. McCARTHY.
PROCESS OF MANUFACTURING INSULATORS.
APPLICATION FILED MAR. 6, 1909.
941,032.
Patented Nov. 23, 1909.
2 SHEETS—SHEET 1.
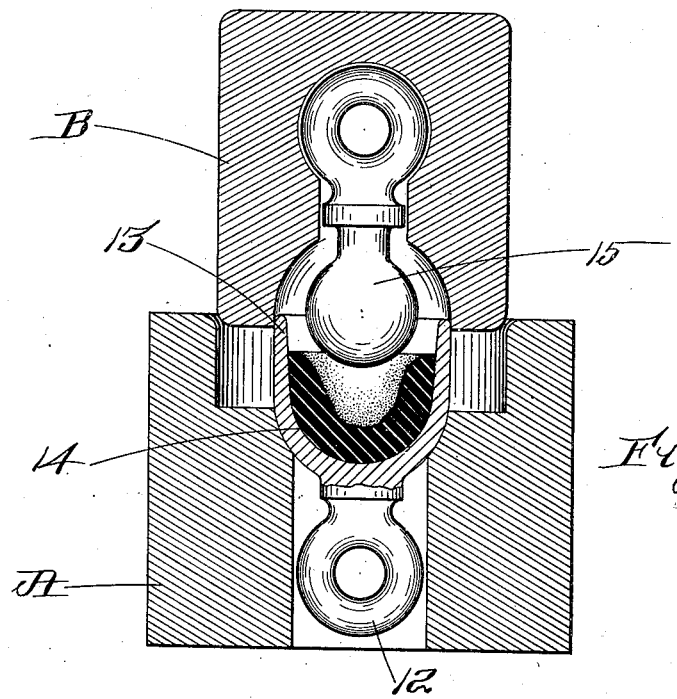
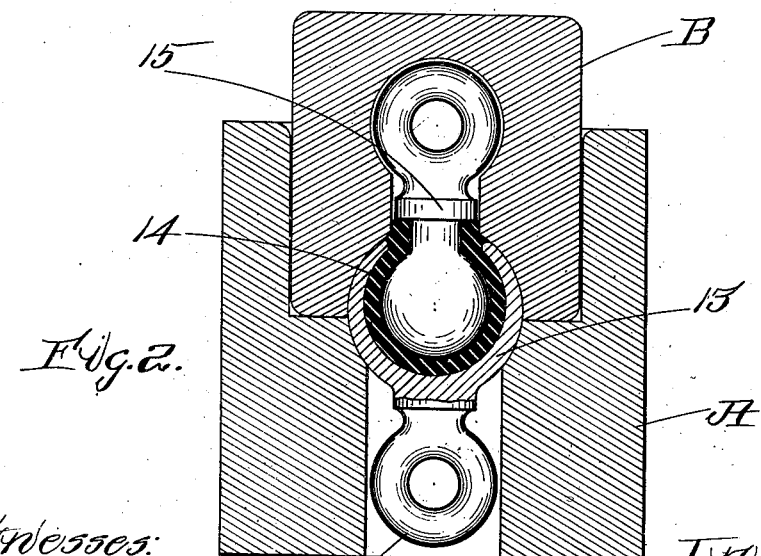

L. McCARTHY.
PROCESS OF MANUFACTURING INSULATORS.
APPLICATION FILED MAR. 6, 1909.
941,032.
Patented Nov. 23, 1909.
2 SHEETS—SHEET 2.
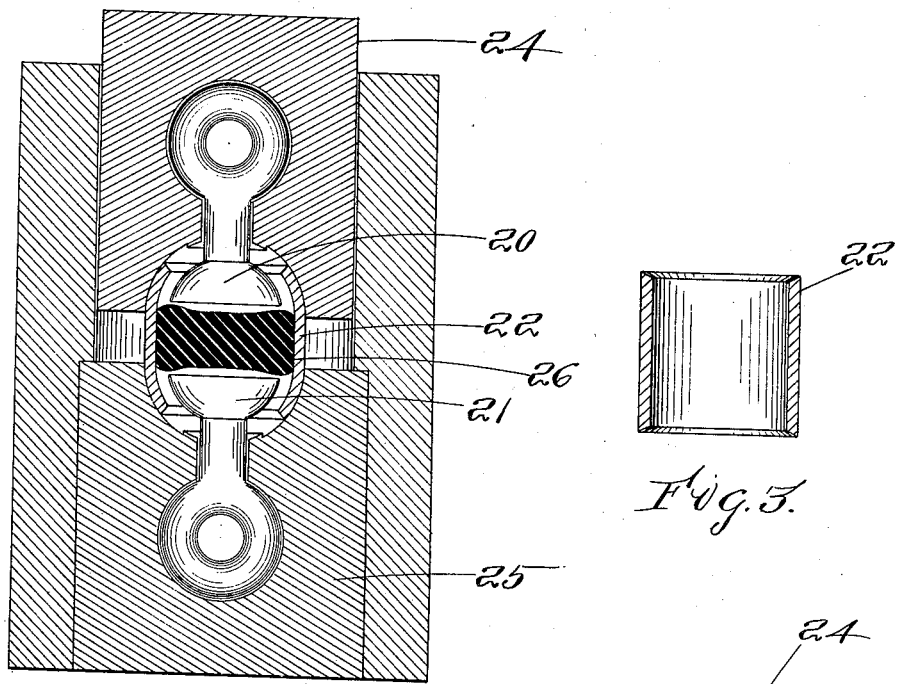
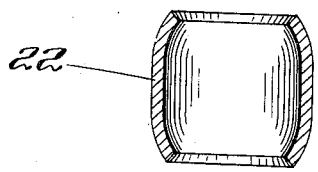
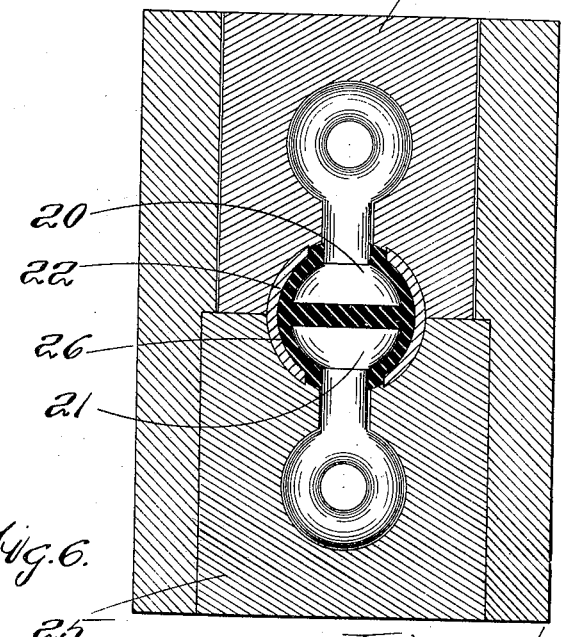

UNITED STATES PATENT OFFICE.

LOUIS McCARTHY, OF BOSTON, MASSACHUSETTS, ASSIGNOR TO THE MACALLEN COMPANY, OF BOSTON, MASSACHUSETTS, A CORPORATION OF MASSACHUSETTS.

PROCESS OF MANUFACTURING INSULATORS.

941,032.  Specification of Letters Patent.  Patented Nov. 23, 1909.

Application filed March 6, 1909. Serial No. 481,689.

*To all whom it may concern:*

Be it known that I, LOUIS McCARTHY, citizen of the United States, residing at Boston, county of Suffolk, State of Massachusetts, have invented a certain new and useful Improvement in Processes of Manufacturing Insulators, of which the following is a specification, reference being had therein to the accompanying drawings.

My present invention has for its object a new and improved process by the employment of which insulators and more particularly strain insulators may be constructed.

It relates particularly to the manufacture of that class of insulators in which one or more male members each formed with a protuberance thereon is incased within a folded female member, the said members being separated by interposed insulation.

Heretofore in making insulators of this class, it has been customary, so far as is known to me, to take the male member and place upon the protuberance or ball shaped end thereof, a mass of insulation in a plastic state, subject the said mass of insulation to heavy pressure in a suitable die so that said plastic insulation is rendered hard, then insert the said male member and its overlying coating of hard insulating material inside the female member and then fold the female member forcibly upon the insulation after which the whole may be covered with an outer layer of insulation if desired. This method of manufacturing these insulators is objectionable in that the female member cannot be caused to lie sufficiently close in contact with the exterior surface with the insulating material as to exclude completely all air and moisture, the presence of which even in infinitesimal quantities tends to assist the passage of the electric current.

By employing the method of embodying my invention, I succeed in producing an insulator which affords a much higher resistance to the passage of the electric current than do similar insulators as heretofore constructed.

The process embodying my invention also involves a smaller number of steps and is consequently more economical.

The insulators produced by the employment of my process are also less frequently defective and therefore it is not necessary to discard so many insulators as the result of the tests to which they are subjected before being offered for sale.

My improved process consists essentially in placing insulating material while in a plastic state between the male and the female members and folding or shaping the female member while the insulating material is still in plastic condition. This method enables me to do away entirely with the operation of pressing the insulating material after it has been placed upon the male member in the process as heretofore practiced. It also permits a much more intimate union to be effected between the insulating material and the practiced members than was possible, while the old method was employed, and produces an insulator the members of which have greater rigidity relative to each other.

The invention will be fully understood from the following description taken in connection with accompanying drawings and the novel features are pointed out and clearly defined in the claims at the close of the specification.

In the drawings,—Figure 1 is a sectional view showing the parts of an insulator having one male member and one female member in place in a suitable die and about to be subjected to pressure to fold the female member and shape the plastic insulating material. Fig. 2 shows the same parts after the pressing operation is completed. Fig. 3 is a view in section of the blank from which is formed the female member of a strain insulator having two male members and a female member. Fig. 4 shows the blank shown in Fig. 3 after it has been shaped ready to be assembled. Fig. 5 shows the parts of a strain insulator having two male members and one female member in place in the dies and about to be subjected to pressure to fold the female member and shape the plastic insulating material. Fig. 6 shows the parts shown in Fig. 5 after the pressing operation is completed.

Referring now to Fig. 1 there is shown at A a lower die and at B an upper die. In the lower die is placed the female member 12 having a cup shaped end as shown at 13. Within the cavity of the female member 12 is placed a suitable amount (determined by weighing) of insulating material 14 in a plastic state. Said insulating material may be of any suitable composition such for instance as shellac, asbestos and mica, which is rendered plastic by heat but which, when subjected to pressure and cooled is very hard and affords a high resistance to the passage of the electrical current. The male member 15 is then placed in the upper die B and the said dies A and B are forced together with a heavy pressure by means of a hydraulic press or the like until the parts assume the position shown in Fig. 2. It will be seen that by this action the ball-shaped portion of the male member is properly located in the center of the insulating material 14; that the said insulating material is then caused to assume the proper position about the ball-shaped end of the male member and about the stem or throat thereof; and that the cup-shaped portion of the female member 12 is closed in upon the insulating material 14, thereby compressing said insulating material very forcibly, any excess of insulating material is forced out about the neck of the male member. As this operation takes place while the insulating material is still in a warm and plastic state, the interposed layer of insulating material 14 is forcibly compressed between the outer surface of the male member 15 and the inner surface of the cup-shaped female member 12 and thereby the air and moisture is almost wholly excluded, thus increasing the insulative power of the finished insulator.

After being removed from the dies the exterior of the joint may or may not be covered with insulating material as desired. As this is old and well known to those skilled in the art, I have not thought it necessary to illustrate it.

Referring now to Figs. 3 to 6 the process will be described as employed in the manufacture of strain insulators having two male members. The male members are indicated at 20 and 21, Fig. 5 and are headed as shown.

In Fig. 3 there is shown the tubular blank 22 from which the female member is formed. Before the parts are assembled, this blank 22 is shaped a little at the ends as shown in Fig. 4. The parts are then assembled in the dies 24 and 25 (see Fig. 5) with a suitable amount (preferably determined by weight) of insulating material 26 in plastic state inserted in the female member between the male members. After the parts have been assembled, the dies are forced together in a hydraulic press and the parts assume the form shown in Fig. 6, the said female member 22 being compressed upon the plastic insulating material and shaping and compressing it to the desired form. It will be seen that this process is identical with that previously described in connection with the manufacture of strain insulators having a single male member.

What I claim is:

1. The improved process of manufacturing insulators which comprises placing insulating material in plastic state between male and female members and then subjecting said female member to pressure sufficient to shape said female member while said insulating material is still in plastic state.

2. The improved process of manufacturing insulators which comprises placing insulating material in plastic state between male and female members and then subjecting said female member to pressure sufficient to shape said female member and simultaneously therewith mold said insulating material while said insulating material is still in plastic state.

In testimony whereof I affix my signature, in presence of two witnesses.

LOUIS McCARTHY.

Witnesses:
  JENNIE E. SCALLAN,
  GEORGE P. DIKE.